US011261922B2

(12) United States Patent
Burke et al.

(10) Patent No.: US 11,261,922 B2
(45) Date of Patent: Mar. 1, 2022

(54) CLUTCH ASSEMBLY FOR TRANSMISSION

(71) Applicant: Schaeffler Technologies AG & Co. KG, Herzogenaurach (DE)

(72) Inventors: Peter Burke, Charlotte, NC (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/931,822

(22) Filed: Jul. 17, 2020

(65) Prior Publication Data

US 2021/0054886 A1 Feb. 25, 2021

Related U.S. Application Data

(60) Provisional application No. 62/891,137, filed on Aug. 23, 2019.

(51) Int. Cl.
*F16D 13/74* (2006.01)
*F16D 13/32* (2006.01)
*F16D 41/12* (2006.01)
*F16D 41/04* (2006.01)

(52) U.S. Cl.
CPC .............. *F16D 41/12* (2013.01); *F16D 41/04* (2013.01)

(58) Field of Classification Search
CPC ............... F16D 41/04; F16D 41/12–16; F16D 41/14–16; F16D 27/00–14; F16D 11/16; F16H 63/34
USPC ....................................................... 192/45.1
See application file for complete search history.

(56) References Cited

U.S. PATENT DOCUMENTS

| | | | |
|---|---|---|---|
| 6,244,965 B1 | 6/2001 | Klecker et al. | |
| 6,481,551 B1 | 11/2002 | Ruth | |
| 9,109,636 B2 | 8/2015 | Kimes et al. | |
| 9,121,454 B2 | 9/2015 | Pawley | |
| 10,859,125 B2 * | 12/2020 | Cioc | F16D 27/118 |
| 2016/0201740 A1 * | 7/2016 | Kimes | F16D 27/00 192/46 |
| 2018/0266502 A1 | 9/2018 | Shioiri et al. | |
| 2020/0149597 A1 * | 5/2020 | Hand | F16D 48/06 |

FOREIGN PATENT DOCUMENTS

| | | | |
|---|---|---|---|
| DE | 102017214933 A1 | 3/2018 | |
| WO | WO-2020227818 A1 * | 11/2020 | F16D 41/16 |

* cited by examiner

*Primary Examiner* — Charles A Fox
*Assistant Examiner* — Farhana Pervin
(74) *Attorney, Agent, or Firm* — LeKeisha Suggs (57) ABSTRACT

A clutch assembly includes an outer ring having a first and second pocket, and an inner ring. A strut and pawl may be disposed within the first and second pockets. The pawl may be configured such that rotation of the strut pushes the pawl toward teeth of the inner ring for engagement therewith. In a first mode of operation, the pawl does not contact the teeth and the inner ring is free to rotate in the first and second rotational directions. In a second mode of operation, the pawl is in partial engagement with the teeth and the inner ring is free to rotate in the second rotational direction and prevented from rotation in the first rotational direction. In a third mode of operation, the pawl is in full engagement with the teeth and the inner ring is prevented from rotation in both the first and the second rotational directions.

18 Claims, 12 Drawing Sheets

CLUTCH ASSEMBLY FOR TRANSMISSION

TECHNICAL FIELD

The present disclosure generally relates to clutch assemblies and more particularly to clutch assemblies for transmission applications.

BACKGROUND

A clutch is a component used to selectively couple two or more components such as rotatable shafts. The clutch may be engaged to couple the components and may be disengaged to decouple the components.

SUMMARY

In general, embodiments of the present disclosure provide a clutch assembly including an actuator, an outer ring having a first pocket and a second pocket defined in an inner surface thereof, and an inner ring disposed radially inward of the outer ring and rotatable about an axis in a first and a second rotational direction. A strut is disposed within the first pocket and configured to be rotated in the first or the second rotational direction by the actuator. A pawl is disposed within the second pocket and configured such that rotation of the strut rotates the pawl toward teeth disposed on an outer surface of the inner ring for engagement therewith to prevent rotation of the inner ring in the first rotational direction and/or the second rotational direction. In a first mode of operation, the pawl does not contact the teeth, the inner ring is rotatable in the first rotational direction and the second rotational direction, and the actuator is in a powered-off state. In a second mode of operation, the pawl is in partial engagement with the teeth, the inner ring is free to rotate in the second rotational direction and prevented from rotation in the first rotational direction, and the actuator is in a powered-on state. In a third mode of operation, the pawl is in full engagement with the teeth and the inner ring is prevented from rotation in the first and the second rotational directions.

In embodiments, the actuator includes an actuator plate having a notch. The strut includes a body portion, a first flange extending radially outward from the body portion, and a second flange extending radially inward from the body portion. The first flange is received within the notch of the actuator plate. The first flange is configured to rotate within the first pocket between a first wall and a second wall in response to axial displacement of the actuator plate in a first axial direction or a second axial direction. The outer ring may include a third pocket adjacent the first pocket and a first spring disposed in the third pocket and radially aligned with the actuator plate. The spring may bias the actuator plate in a first position where the first flange contacts the first wall.

In embodiments, in the first mode of operation: the actuator plate is in the first position; the first flange of the strut contacts the first wall of the first pocket; the second flange of the strut abuts an inner surface of the outer ring; and the pawl is biased, by a second spring disposed within the second pocket, in a retracted position such that a gap is formed between the pawl and the teeth of the inner ring. In the second mode of operation: the actuator plate is moved by the actuator in a first axial direction to a second position partially compressing the first spring within the third pocket; the first flange is rotated in the second rotational direction by the actuator plate to a position between the first wall and the second wall; and the second flange of the strut pushes the pawl into partial engagement with the teeth of the inner ring to allow rotation of the inner ring in the second rotational direction and prevent rotation of the inner ring in the first rotational direction. In the third mode of operation: the actuator plate is displaced, by the actuator, further in the first axial direction to a third position fully compressing the first spring within the pocket; the first flange is rotated, by the actuator plate, further in the second rotational direction to contact the second wall of the first pocket; and the second flange of the strut is rotated between the outer ring and the pawl to lock the pawl with the teeth of the inner ring to prevent rotation of the inner ring in the first and second rotational directions. The second flange may be arranged on a flat region of an outer surface of the pawl.

In embodiments, to transition from the second mode of operation to the first mode of operation: the actuator is commanded to a powered-off state and the actuator plate is moved in a second axial direction by the first spring to the first position, thereby rotating the first flange in the first rotational direction to contact the first wall. In embodiments, to transition from the second mode of operation to the third mode of operation, a reverse torque is applied to the inner ring. In embodiments, to transition from the third mode of operation to the first mode of operation, the actuator is commanded to a powered-off state and a reverse torque is applied to the inner ring.

In embodiments, a clutch assembly is provided with an actuator, an outer ring having a first pocket and a second pocket, and an inner ring disposed radially inside of the outer ring and rotatable about an axis in a first rotational direction and a second, opposite, rotational direction. A strut and pawl may be rotatably disposed within the first and second pockets, respectively. The pawl may be configured to be rotated by the strut to selectively engage with teeth disposed on an outer surface of the inner ring to prevent rotation of the inner ring in the first rotational direction and/or the second rotational direction. In an intermediate mode of operation, the actuator is in a powered-on state, the pawl is in partial engagement with the teeth of the inner ring, and the inner ring is free to rotate in the second rotational direction and is prevented from rotation in the first rotational direction. In response to the actuator being commanded to a powered-off state during the intermediate mode of operation, the pawl rotates toward the outer ring and away from the teeth to a retracted position that allows rotation of the inner ring in both the first and second rotational directions. In response to application of a reverse torque to the inner ring during the intermediate mode of operation, the pawl is forced into full engagement with the teeth to prevent rotation of the inner ring in both the first and the second rotational directions.

In embodiments, the actuator includes an actuator plate having a notch. The strut includes a body portion, a first flange extending radially outward from the body portion, and a second flange extending radially inward from the body portion. The first flange may be received within the notch of the actuator plate and be configured to be rotated within the first pocket by axial displacement of the actuator plate. In a freewheel mode, the pawl does not contact the teeth, the first flange of the strut contacts a first wall of the first pocket, the inner ring is rotatable in the first rotational direction and the second rotational direction, and the actuator is in the powered-off state. In a locked mode, the pawl is in full engagement with the teeth, the first flange of the strut contacts a second wall of the first pocket opposite the first wall, the second flange of the strut is disposed on a flat region of the pawl between the inner ring and the outer ring, and the inner ring is prevented from rotation in both the first and the second rotational directions.

In embodiments, the actuator may be a solenoid configured to move the actuator plate in an axial direction to rotate the strut within the first pocket. The outer ring may include a third pocket adjacent the first pocket and a spring may be disposed within the third pocket and configured to bias the actuator plate toward the actuator. The actuator plate may be configured to axially displace into the third pocket to compress the spring and rotate the strut within the first pocket in response to the actuator being commanded to the powered-on state. A spring may further be disposed within the second pocket and be configured to bias the pawl toward the outer ring and away from the inner ring.

Embodiments disclosed herein provide the advantageous benefit of a transition or intermediate mode between locked and disengaged positions of the clutch assembly that allows for a "change of mind" of clutch engagement without any additional signal to the clutch.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
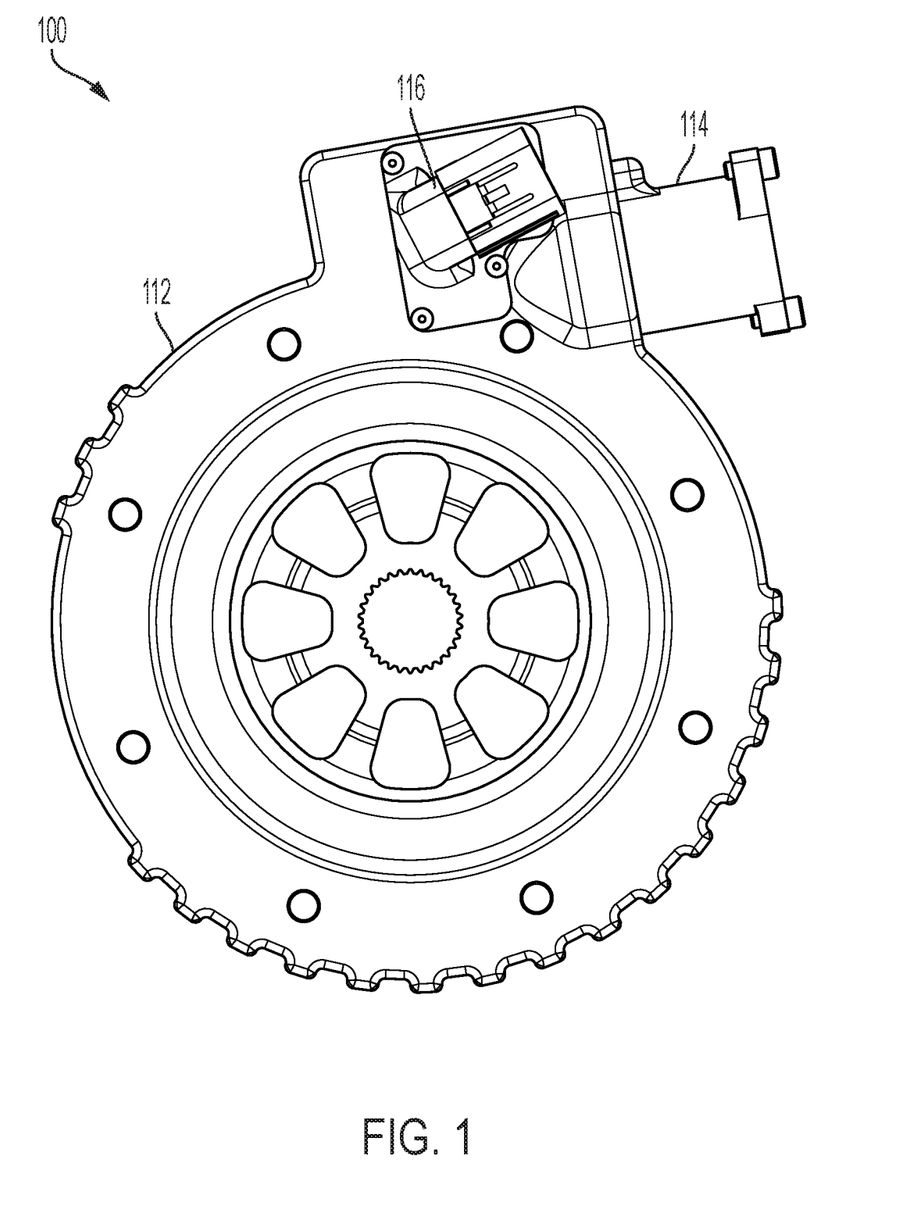
FIG. 1 is a front view of a clutch assembly according to one embodiment of the present disclosure.
Figure 2:
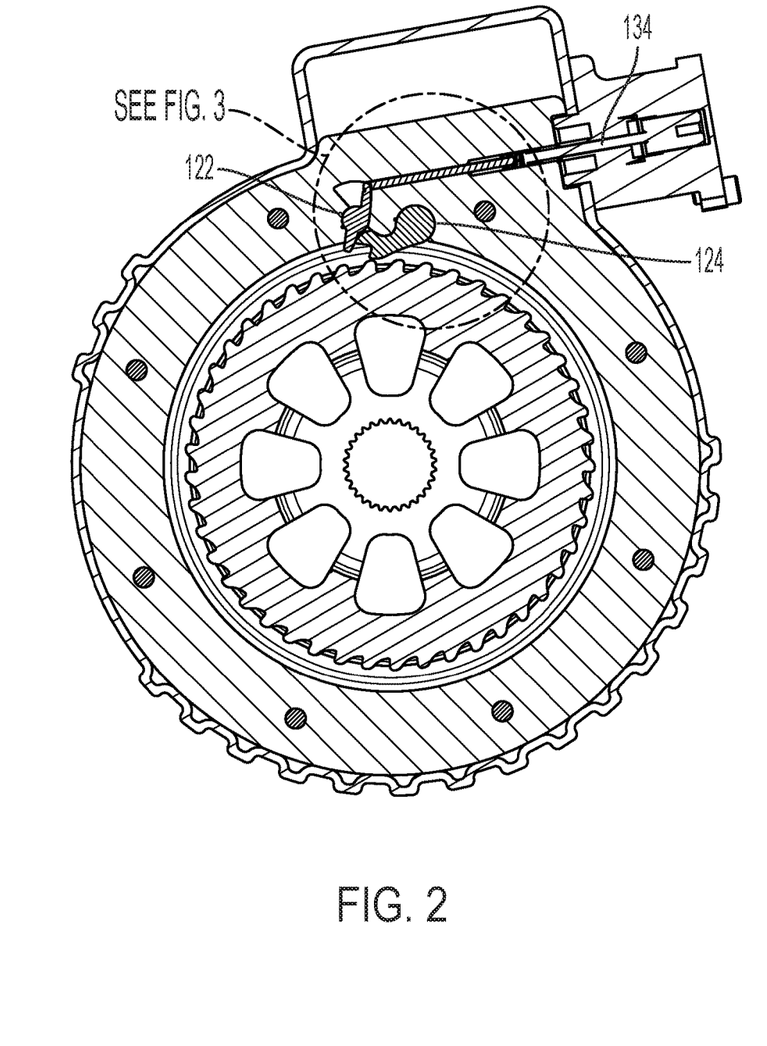
FIG. 2 is a cross-sectional view of the clutch assembly shown in FIG. 1.
Figure 3:
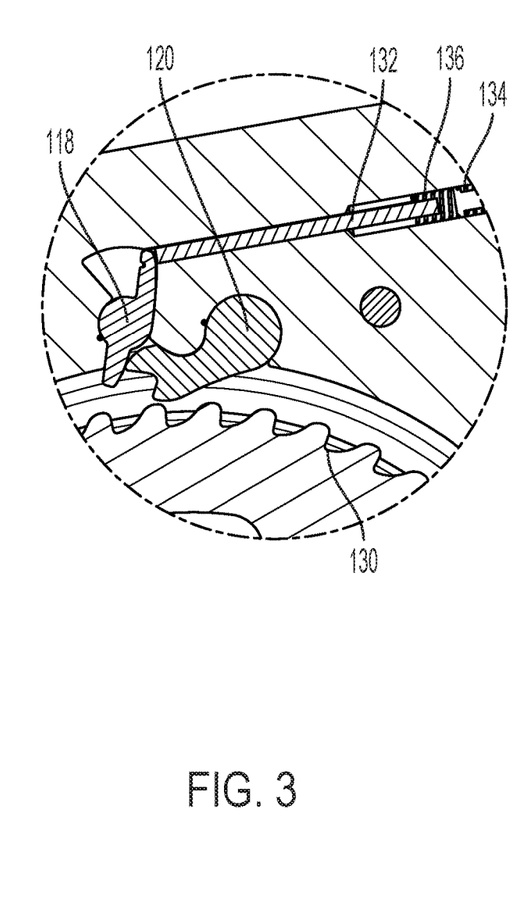
FIG. 3 is an enlarged view of the pawl and strut arrangement shown in FIG. 2.
Figure 4:
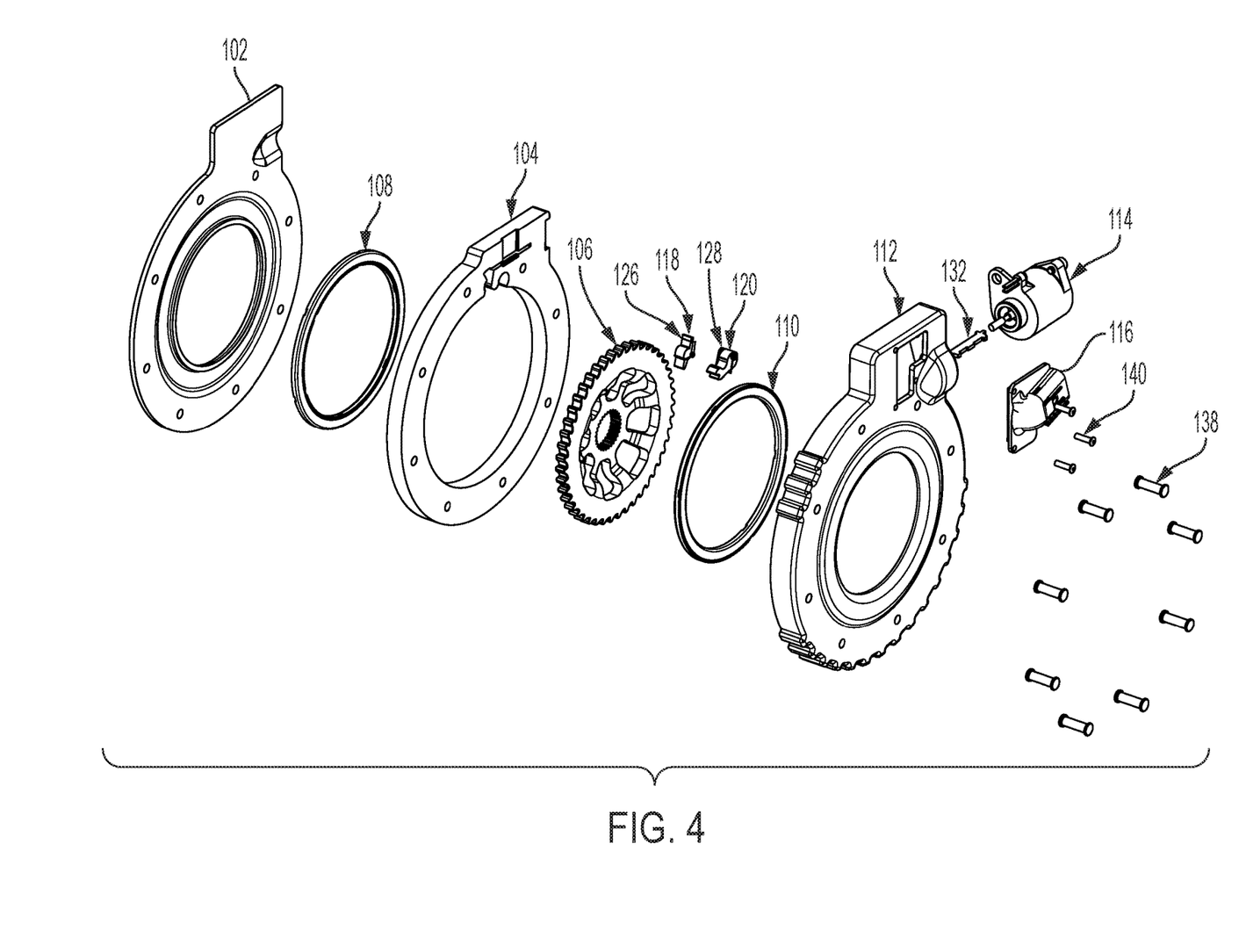
FIG. 4 is an exploded view of the clutch assembly shown in FIG. 1.

The following description is made with reference to FIGS. 1-4. FIG. 1 shows a front view of clutch assembly 100 according to one embodiment of the present disclosure. FIG. 2 is a cross-sectional view of clutch assembly 100. FIG. 3 is an enlarged view of the pawl and strut arrangement of clutch assembly 100. FIG. 4 is an exploded view of clutch assembly 100. Clutch assembly 100 includes retainer, or back cover, plate 102, outer ring 104, inner ring 106, bearings 108 and 110, front cover plate 112, actuator or solenoid 114, sensor 116, strut 118, and pawl 120. Bearings 108 and 110 are disposed on opposite axial sides of inner ring 106. Outer ring 104 includes pockets, or recesses, 122 and 124 defined in an inner surface thereof that open radially inwardly toward inner ring 106. Pockets 122 and 124 are formed and sized to accommodate strut 118 and pawl 120, respectively. Strut 118 and pawl 120 are pivotable, or rotatable, within pockets 122 and 124. Strut 118 is retained in pocket 122 by spring 126 and pawl 120 is retained in pocket 124 by spring 128. Springs 126 and 128 bias strut 118 and pawl 120, respectively, toward outer ring 104 and away from inner ring 106. That is, pawl 120 does not contact teeth 130 of inner ring 106 such that there is a gap between pawl 120 and inner ring 106. In this position, inner ring is free to rotate about an axis in first rotational direction R1 or in an opposite, second rotational direction R2.

Clutch assembly 100 further includes actuator plate 132 and actuator pin, or plunger, 134 configured and arranged to be axially displaced to rotate strut 118 within pocket 122 such that strut 118 urges, or pushes, pawl 120 to rotate within pocket 124 to engage inner ring 106 to stop rotation of inner ring 106. That is, in response to solenoid 114 being powered on, actuator pin or plunger 134 moves in first axial direction AD1 toward actuator plate 132 compressing spring 136 such that actuator plate 132 is axially displaced in first axial direction AD1. Displacement of actuator plate 132 in first axial direction AD1 rotates strut 118 within pocket 122, and strut 118 then urges or pushes pawl 120 toward teeth 130 disposed on outer surface of inner ring 106.

For assembly, back cover plate 102, outer ring 104, and front cover plate 112 are connected to each other via fasteners 138. Although eight fasteners 138 are shown in FIG. 4, one of ordinary skill in the art would understand that fewer or more fasteners may be used. Sensor 116 may be connected to front cover plate 112 via fasteners 140.

Figure 5:
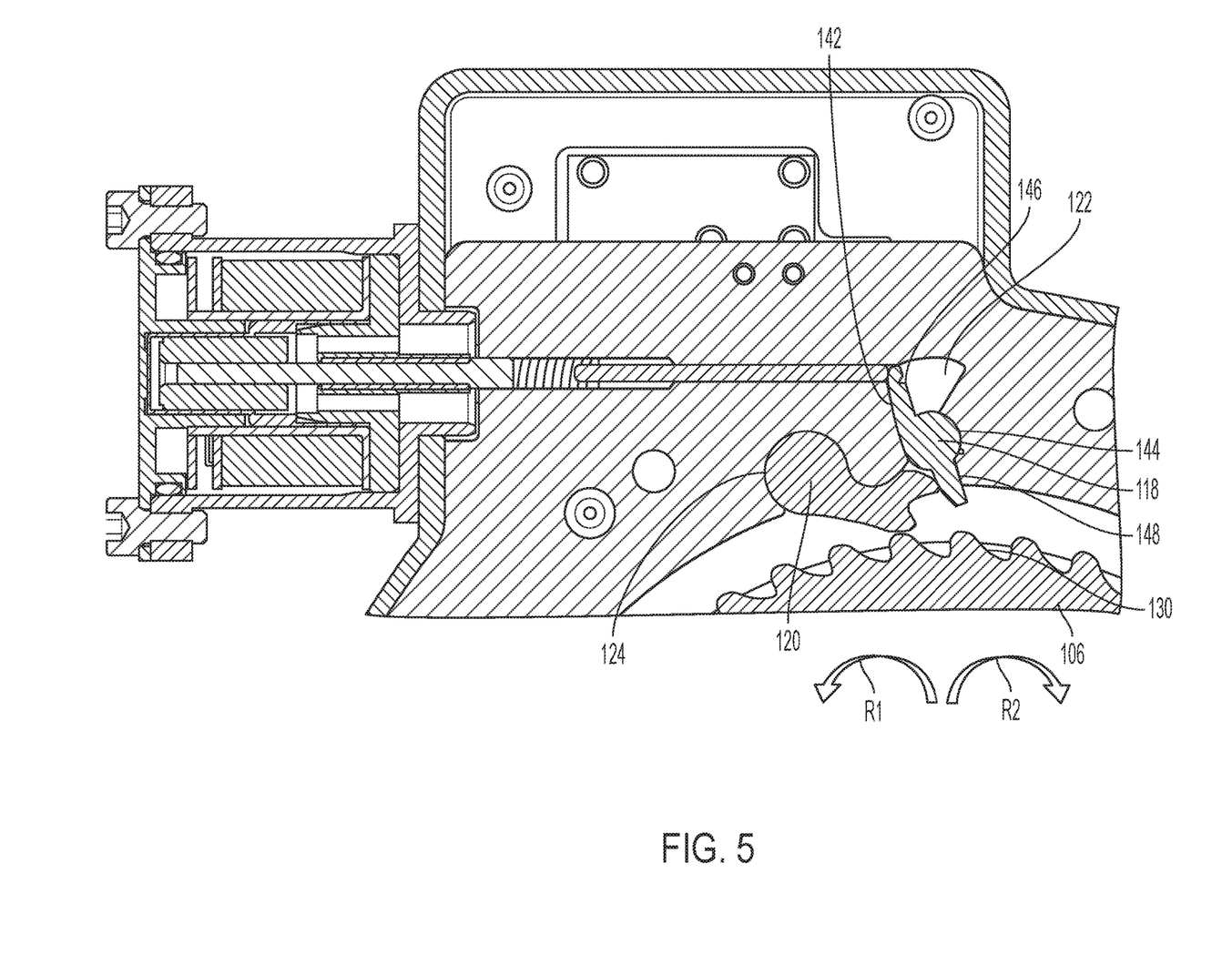
FIG. 5 shows a disengaged, or freewheel, mode of operation of the clutch assembly shown in FIG. 1.
Figure 6:
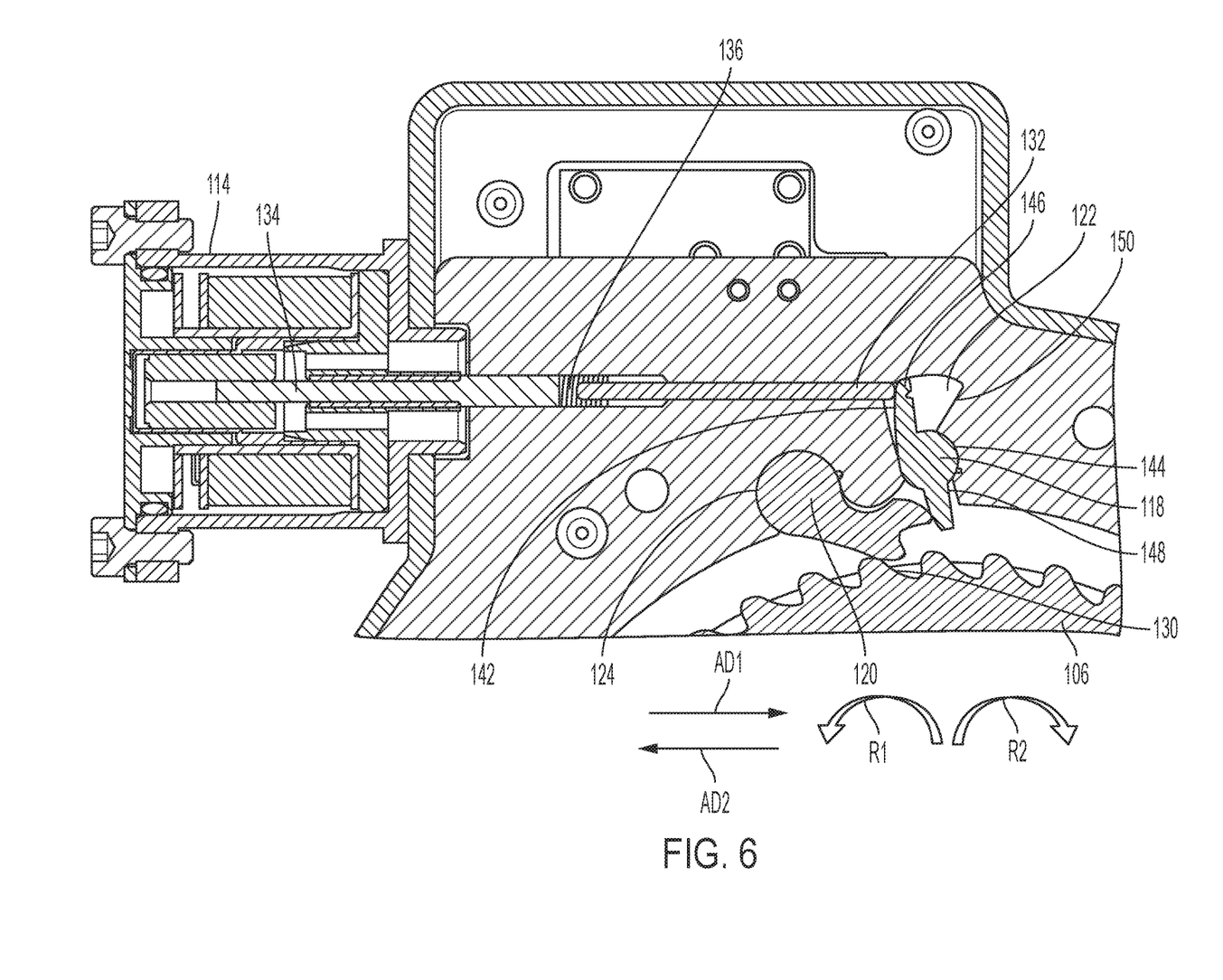
FIG. 6 shows a transition, or intermediate, mode of operation of the clutch assembly shown in FIG. 1.
Figure 7:
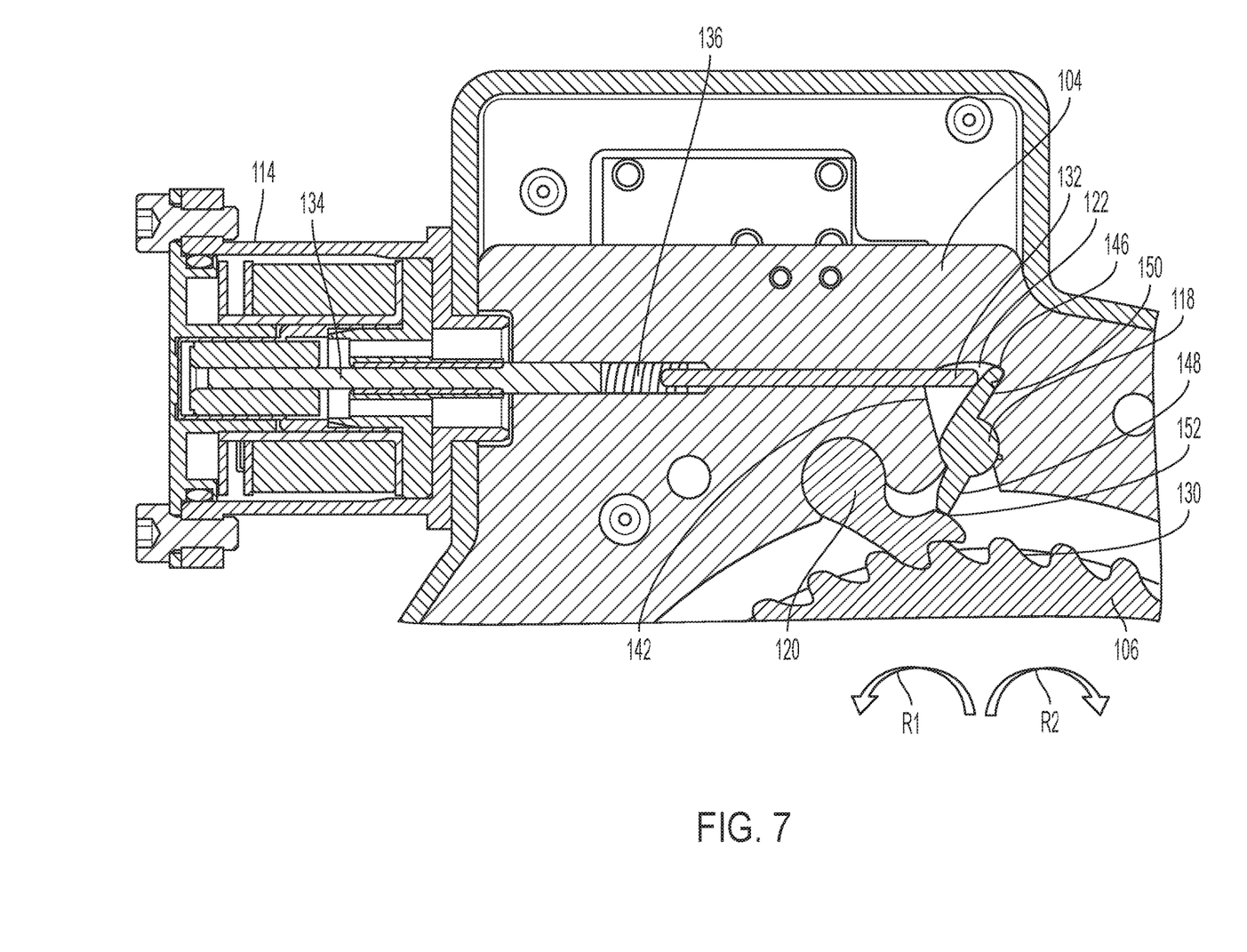
FIG. 7 shows an engaged, or locked, mode of operation of the clutch assembly shown in FIG. 1.

The following description is made with reference to FIGS. 5-7. FIG. 5 shows a disengaged, or freewheel, mode of operation of clutch assembly 100. FIG. 6 shows a transition, or intermediate, mode of operation of clutch assembly 100. FIG. 7 shows an engaged, or locked, mode of operation of clutch assembly 100.

In the disengaged, or freewheel, mode, solenoid 114 is in a powered-off state. Strut 118 and pawl 120 are biased toward outer ring 104 such that pawl 120 is not contacting, or engaged with, teeth 130 of inner ring 106. That is, a gap is formed between pawl 120 and teeth 130 of inner ring 106. In this position, strut 118 contacts a first wall 142 of pocket 122. Strut 118 may include a rounded body portion 144, first flange 146, and second flange 148. First flange 146 may extend radially outward from body portion 144 and second flange 148 may extend radially inward toward inner ring 106 from body portion 144. In the disengaged mode, first flange 146 of strut 118 contacts first wall 142 of pocket 122. Inner ring 106 is free to rotate in first rotational direction R1 and second rotational direction R2. In the embodiment shown, first rotational direction R1 may correspond with a counter-clockwise direction and second rotational direction R2 may correspond with a clockwise direction.

In the transition or intermediate mode, solenoid 114 is in a powered-on state and plunger 134 compresses spring 136 to displace actuator plate 132 in first axial direction AD1 towards strut 118 and into pocket 122. Actuator plate 132 contacts strut 118 and forces strut 118 to rotate in second rotational direction R2 within pocket 122. That is, actuator plate 132 contacts first flange 146 of strut 118 and exerts a force causing first flange 146 to rotate in second rotational direction R2 such that first flange 146 does not contact first wall 142. First flange 146 is rotated to a position within pocket 122 between first wall 142 and a second wall 150 opposite first wall 142. Rotation of first flange 146 urges or pushes pawl 120 toward teeth 130 of inner ring 106 such that pawl 120 partially engages with teeth 130. That is, second flange 148 of strut 118 contacts and pushes pawl 120 radially inward to partially engage, but not fully lock or mesh, with teeth 130 of inner ring 106. In this way, pawl 120 is drawn partially into teeth 130 but pawl 120 does not fully engage, or lock, with inner ring 106. Through this partial engagement, inner ring 106 is permitted to freewheel or rotate in second rotational direction R2 and is locked or prevented from rotating in first rotational direction R1.

Moreover, from the transition mode, clutch 100 may either return to the freewheel mode by turning off power to solenoid 114 or may shift to the locked mode by applying a reverse torque. That is, pawl 120 and strut 118 will ratchet in second rotational direction R2 and remain in the transition mode of operation until a reverse torque occurs to fully lock or mesh pawl 120 with teeth 130 of inner ring 106 or power to solenoid 114 is turned off thereby transitioning back to the freewheel mode. By reverse torque, this means rotating inner ring 106 in the opposite direction it is currently rotating in. In this way, strut 118 and pawl 120 are in position to lock with inner ring 106 in the transition mode, but, a "change of mind" is still possible without any additional signal to clutch assembly 100. If it is decided that engagement is not desired, then turning off power to solenoid 114 will result in pawl 120 rotating back into its retracted, disengaged position depicted in FIG. 5. For example, in a transmission application, this would allow for a driver to press on the brake and then change its mind by releasing the brake and depressing gas pedal. This transition mode that allows for a "change of mind" without any additional signal to the clutch is an advantageous benefit of this design.

In the engaged or locked mode, pawl 120 is fully locked, or meshed, with teeth 130 and inner ring 106 is prevented from rotation in either first rotational direction R1 or in second rotational direction R2. In response to a torque reversal occurring when clutch assembly 100 is in the transition mode, pawl 120 is forced into full engagement with teeth 130 of inner ring 106, such that strut 118 is rotated to a position between pawl 120 and outer ring 104 thereby locking pawl 120 in place, or engagement, with teeth 130. That is, inner ring 106 may be forced to rotate in first rotational direction R1, thereby forcing pawl 120 into full meshing engagement with teeth 130. Specifically, first flange 146 of strut 118 is rotated further in second rotational direction R2 such that first flange 146 contacts second wall 150 and pawl 120 is drawn fully into teeth 130. Second flange 148 is rotated such that it is positioned on a flat region 152 of a distal end of pawl 120. In this way, inner ring 106 is locked from rotation in both first rotational direction R1 and second rotational direction R2. Power to solenoid 114 may be turned off without disengaging pawl 120 from teeth 130. To disengage clutch assembly 100, solenoid 114 is commanded to a power-off state and a reverse torque is applied to inner ring 106 to force pawl 120 away from strut 118, thereby allowing strut 118 and pawl 120 to rotate back to their retracted positions within pockets 122 and 124, respectively.

Figure 8:
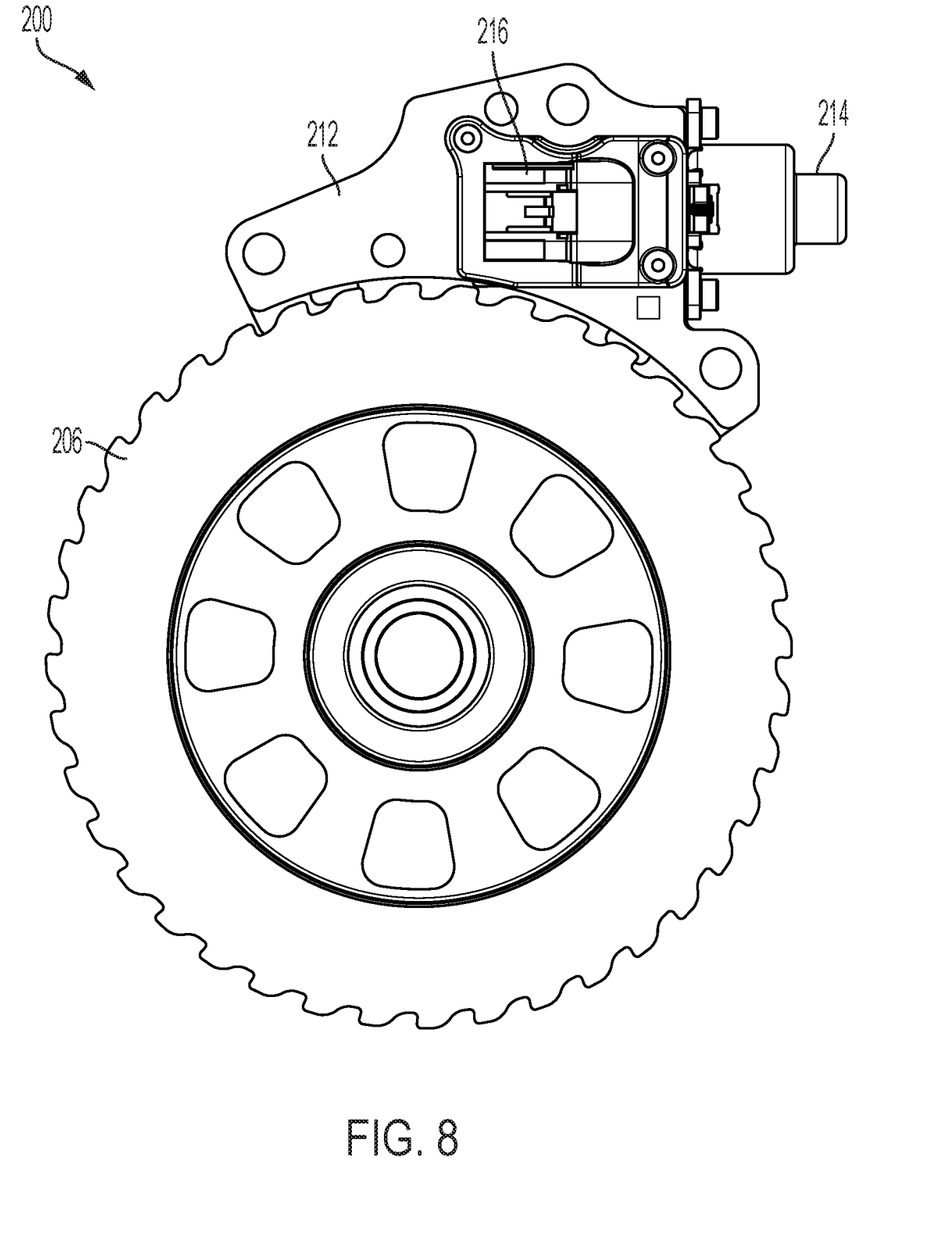
FIG. 8 is a front view of a clutch assembly according to another embodiment of the present disclosure.
Figure 9:
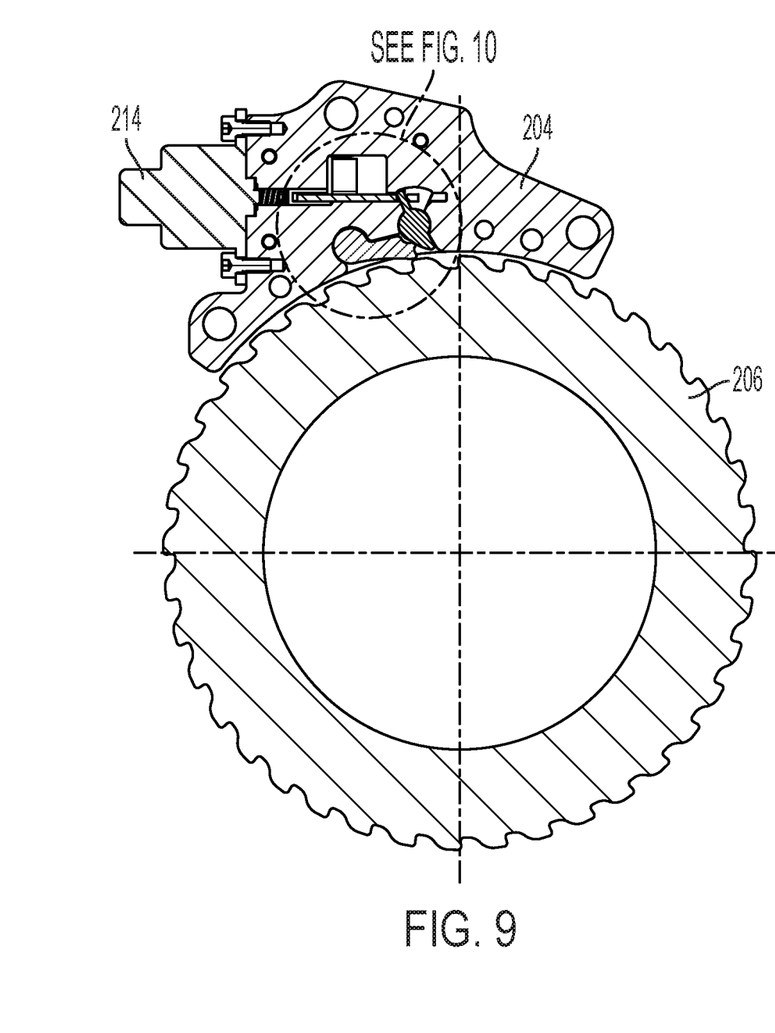
FIG. 9 is a cross-sectional view of the clutch assembly shown in FIG. 8.
Figure 10:
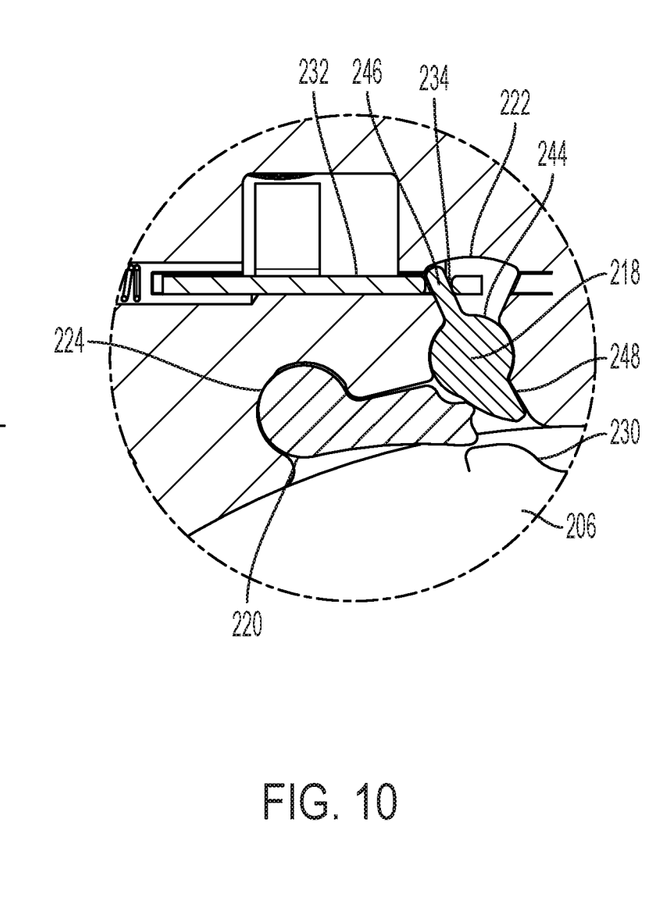
FIG. 10 is an enlarged view of the pawl and strut arrangement shown in FIG. 9.
Figure 11:
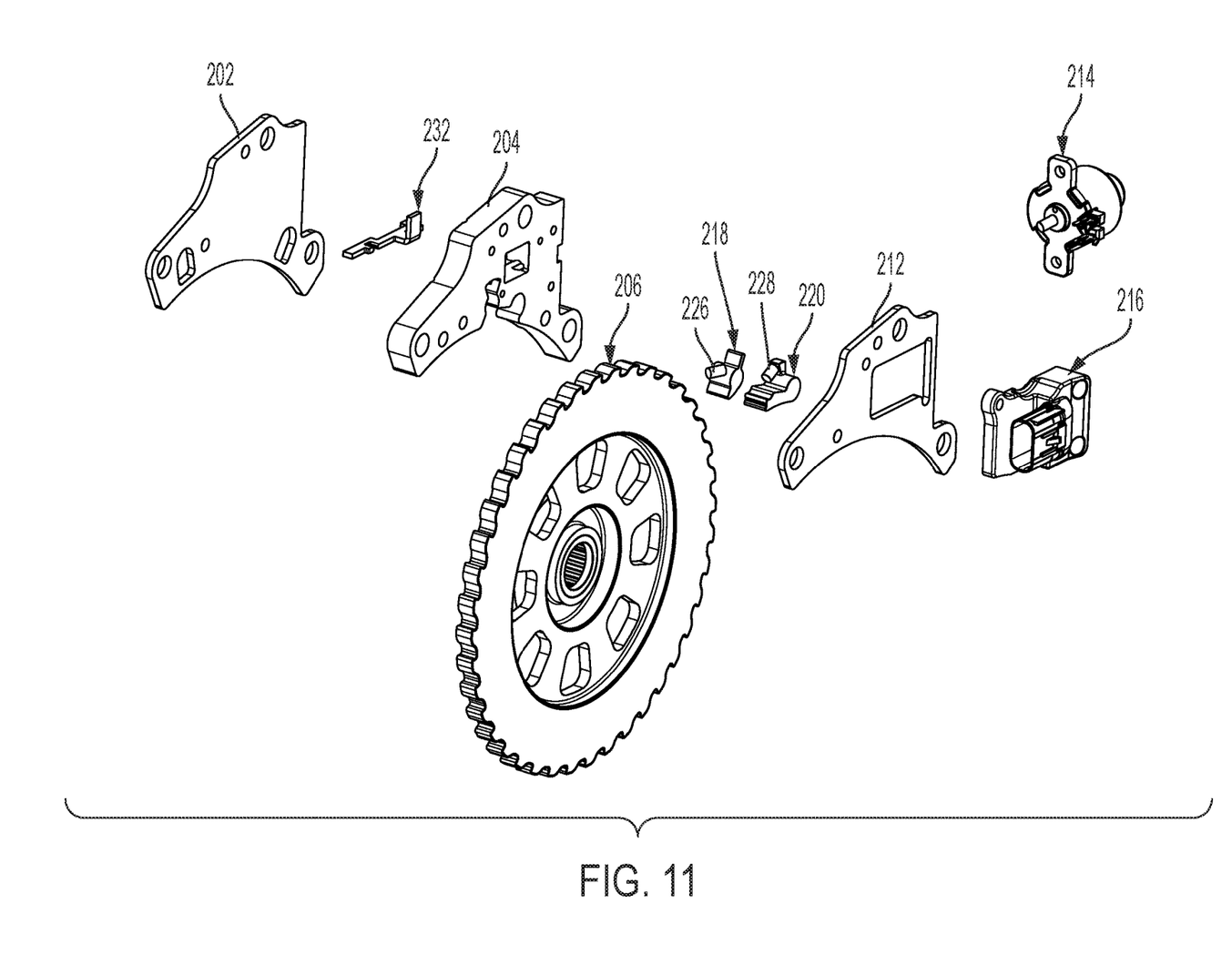
FIG. 11 is an exploded view of the clutch assembly shown in FIG. 8.

The following description is made with reference to FIGS. 8-11. FIG. 8 is a front view of clutch assembly 200 according to another embodiment of the present disclosure. FIG. 9 is a cross-sectional view of clutch assembly 200. FIG. 10 is an enlarged view of the pawl and strut arrangement of clutch assembly 200. FIG. 11 is an exploded view of clutch assembly 200. Clutch assembly 200 includes: retainer plate or back cover plate 202, outer ring 204, inner ring 206, front cover plate 212, actuator or solenoid 214, sensor 216, strut 218, and pawl 220. Strut 218 and pawl 220 are rotatably mounted within pockets, or recesses, 222 and 224, respectively, defined in outer ring 204. Clutch assembly 200 further includes spring 226, spring 228, and actuator plate 232. Spring 226 is positioned in-line with activation plate 232 and solenoid 214. That is, a line extending axially may pass through spring 226, activation plate 232, and solenoid 214. Spring 226 biases actuator plate 232 in second axial direction AD2 toward solenoid 214. Spring 228 biases pawl 220 toward outer ring 204 and away from teeth 230 of inner ring 206 in a retracted position within pocket 224. That is, pawl 220 does not contact teeth 230 of inner ring 206 and a gap is formed therebetween. In this position, inner ring 206 is free to rotate about an axis in first rotational direction R1 or in an opposite, second rotational direction R2.

Actuator plate 232 is configured and arranged to be axially displaced to rotate strut 218 within pocket 222 such that pawl 220 rotates within pocket 224 to engage inner ring 206 to stop rotation of inner ring 206. That is, in response to solenoid 214 being powered on, spring 236 is compressed against actuator plate 232 such that actuator plate 232 is axially displaced to force strut 218 to rotate within pocket 222 and in turn urge or push pawl 220 toward teeth 230 formed on an outer surface of inner ring 206. Actuator plate 232 further includes notch 234 and strut 218 is received in notch 234. Strut 218 may include a rounded body portion 244, first flange 246, and second flange 248. First flange 246 may extend radially outward from body portion 244 and second flange 248 may extend radially inward from body portion 244. First flange 246 may be received within notch 234 and configured such that axial displacement of actuator plate 232 rotates strut 218 within pocket 222. That is displacement of actuator plate 232 in first axial direction AD1 rotates strut 218 in second rotational direction R2 and displacement of actuator 232 in second, opposite axial direction AD2 rotates strut 218 in first rotational direction R1. In consideration of axial constraints and assembly requirements, back cover plate 202, outer ring 204, and front cover plate 212 may be partial plates or annular segments. That is, back cover plate 202, outer ring 204, and front cover plate 212 may not form complete, annular disks.

Figure 12:
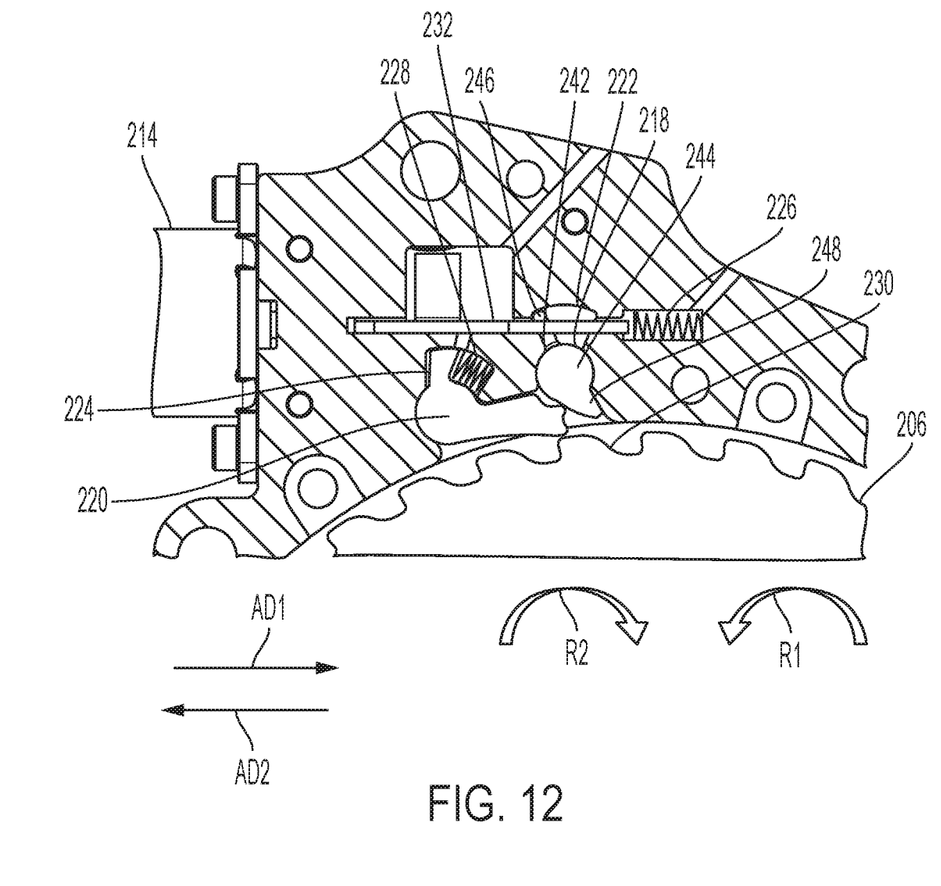
FIG. 12 shows a disengaged, or freewheel, mode of operation of the clutch assembly shown in FIG. 8.
Figure 13:
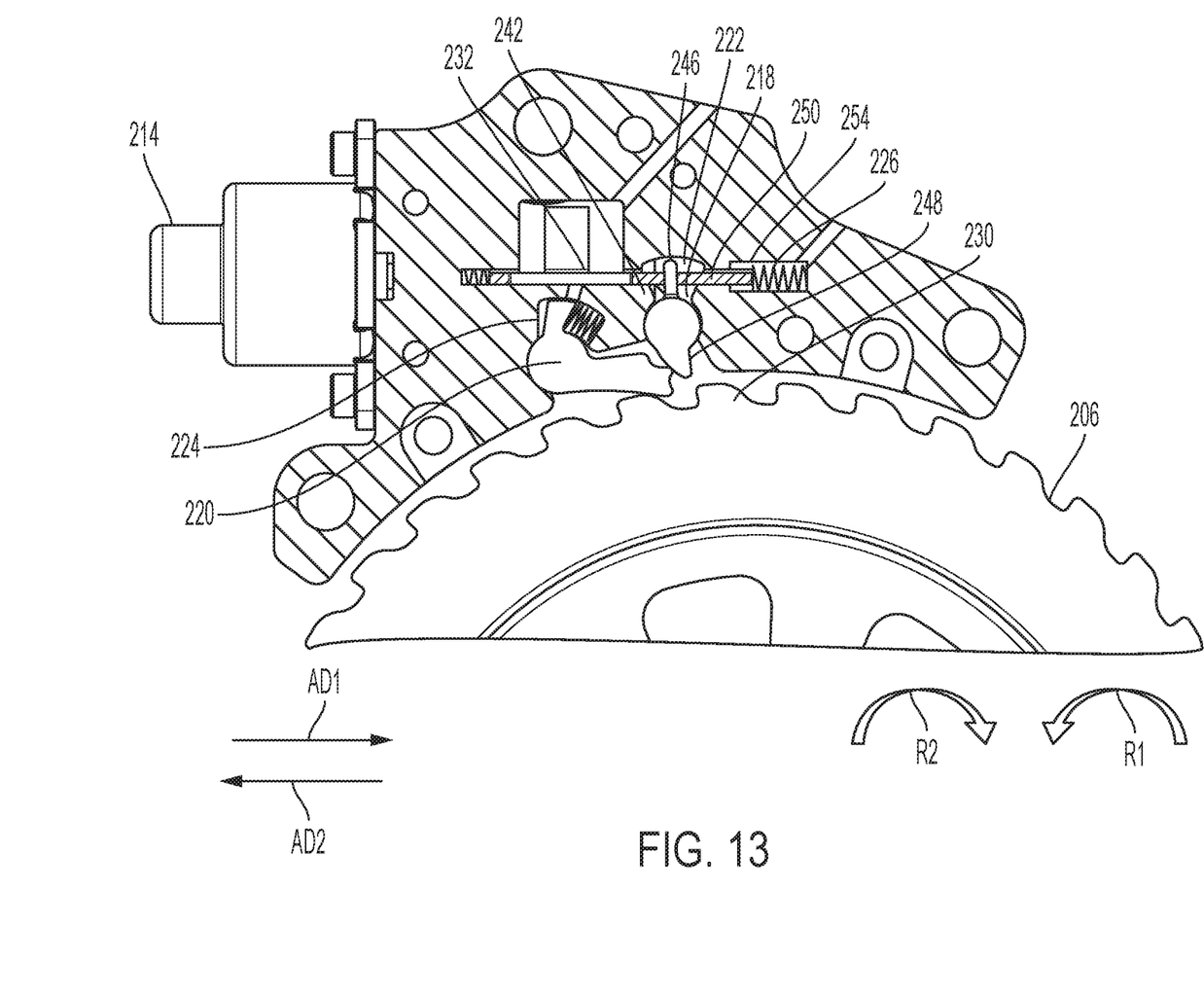
FIG. 13 shows a transition, or intermediate, mode of operation of the clutch assembly shown in FIG. 8.
Figure 14:
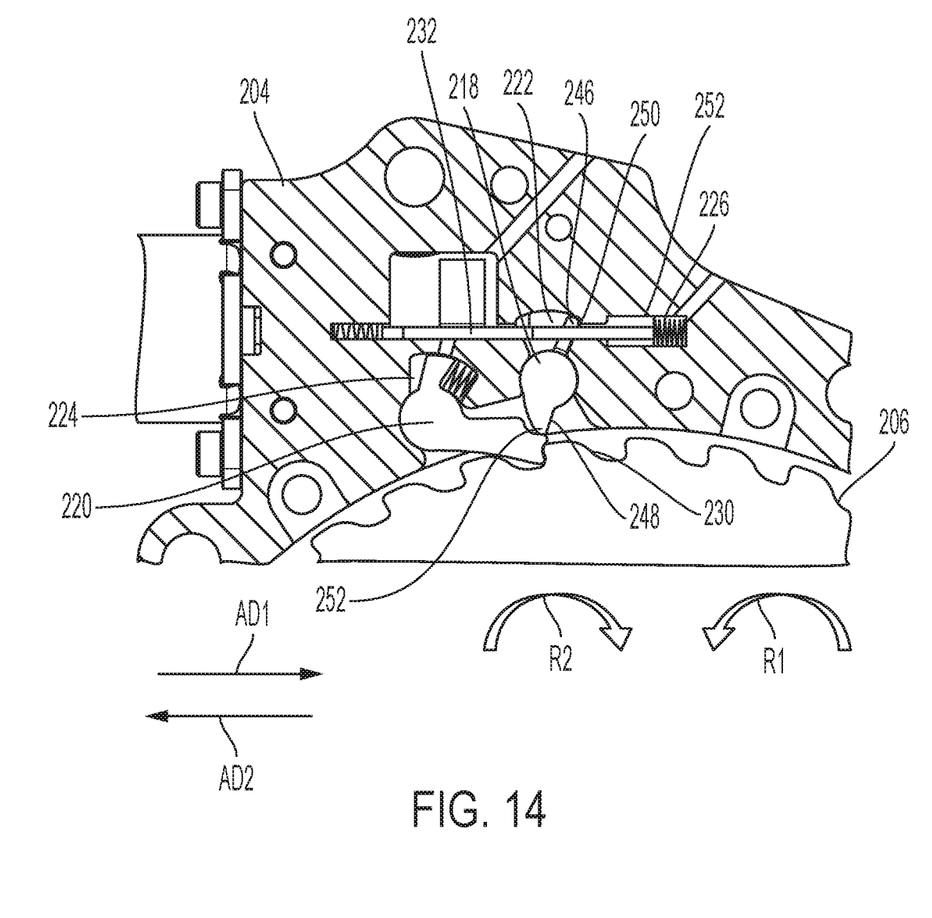
FIG. 14 shows an engaged, or locked, mode of operation of the clutch assembly shown in FIG. 8.

The following description is with reference to FIGS. 12-14. FIG. 12 shows a disengaged, or freewheel, mode of operation of clutch assembly 200. FIG. 13 shows a transition, or intermediate, mode of operation of clutch assembly 200. FIG. 14 shows an engaged, or locked, mode of operation of the clutch assembly.

In the disengaged, or freewheel, mode, solenoid 114 is in a powered-off state. Spring 228 biases pawl 220 toward outer ring 204 in a retracted within pocket 224 such that pawl 220 is not contacting, or engaged with, teeth 230 of inner ring 206. Strut 218 is similarly biased in a retracted position within pocket 222 such that strut 218 contacts a first wall 242 of pocket 222. That is, solenoid 214 is in an powered-off state and spring 226 biases actuator plate 232 in second axial direction AD2 such that actuator plate 232 holds or presses first flange 246 of strut 218 against first wall 242. Inner ring 206 is free to rotate in first rotational direction R1 and second, opposite rotational direction R2. In the embodiment shown, first rotational direction R1 may be a counterclockwise direction and second rotational direction R2 may be a clockwise direction.

In the transition or intermediate mode, solenoid 214 is in a powered-on state and actuator plate 232 is displaced in first axial direction AD1 into pocket 254 to partially compress spring 226. Actuator plate 232 is displaced in first axial direction AD1 such that it forces strut 218 to rotate in second rotational direction R2 within pocket 222. That is, actuator plate 232 rotates first flange 246 of strut 218 in second rotational direction R2 such that first flange 246 does not contact first wall 242. First flange 246 is rotated to a position within pocket 222 between first wall 242 and a second wall 250 opposite first wall 242. Rotation of first flange 246 urges or pushes pawl 220 toward teeth 230 such that pawl 220 partially engages with teeth 230 of inner ring 206. That is, second flange 248 of strut 218 contacts and pushes pawl 220 radially inward to partially engage, but not fully lock or mesh, with teeth 230 of inner ring 206. In this way, pawl 220 is drawn partially into teeth 230 but pawl 220 does not fully engaged with, or lock, with inner ring 206. In this mode, inner ring 206 is permitted to freewheel in second rotational direction R2, but, is prevented from rotation in first rotational direction R1.

Moreover, from the transition mode, clutch assembly 200 may either return to the freewheel mode by turning off power to solenoid 214 or may shift to the locked mode by applying a reverse torque. That is, pawl 220 and strut 218 will ratchet in second rotational direction R2 until a reverse torque occurs to fully lock pawl 220 with inner ring 206 or power to solenoid 214 is turned off. By reverse torque, this means forcing inner ring 206 to rotate in the opposite direction it is currently rotating in. In this way, strut 218 and pawl 220 are in position to lock with inner ring 206 in the transition mode, but, a "change of mind" is still possible without any additional signal to clutch assembly 200. If it is decided that engagement is not desired, then turning off power to solenoid 214 will result in pawl 220 rotating back into its retracted, disengaged position depicted in FIG. 12. For example, in a transmission application, this would allow for a driver to press on the brake and then change its mind by releasing the brake and depressing gas pedal. This transition mode that allows for a "change of mind" without any additional signal to the clutch is an advantageous benefit of this design.

In the engaged or locked mode, pawl 220 is fully locked, or meshed, with teeth 230 and inner ring 206 is prevented from rotation in either first rotational direction R1 or in second rotational direction R2. In response to a torque reversal occurring when clutch assembly 200 is in the transition mode, pawl 220 is forced into full engagement with teeth 230 of inner ring 206, such that strut 218 is rotated to a position between pawl 220 and outer ring 204 thereby locking pawl 220 in place, or engagement, with teeth 230. That is, inner ring 206 may be forced to rotate in first rotational direction R1, thereby forcing pawl 220 into full meshing engagement with teeth 230. Specifically, first flange 246 is rotated further in second rotational direction R2 such that first flange 246 contacts second wall 250 and pawl 220 is drawn fully into teeth 230 allowing second flange 248 to rotate in second rotational direction R2 such that it is positioned on a flat region 252 of pawl 220. Spring 226 is fully compressed by actuator plate 232. In this way, inner ring 206 is locked from rotation in both first rotational direction R1 and second rotational direction R2. Power to solenoid 214 may be turned off without disengaging pawl 220 from teeth 230. To disengage clutch assembly 200, power is turned off to solenoid 214 and application of a reverse torque will force pawl 220 away from strut 218 thereby allowing strut 218 and pawl 220 to rotate back to their disengaged positions within pockets 222 and 224, respectively.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 clutch assembly
102 retainer plate or back cover plate
104 outer ring
106 inner ring
108 bearings
112 front cover plate
114 solenoid
116 sensor
118 strut
120 pawl
122 pocket, or recess
124 pocket, or recess
126 spring
128 spring
130 teeth
132 actuator plate
134 actuator pin or plunger
136 spring
138 fasteners 140 fasteners
142 first wall
144 body portion
146 first flange
148 second flange
150 second wall
152 flat region
200 clutch assembly
202 back cover plate
204 outer ring
206 inner ring
206 means rotating inner ring
212 front cover plate
214 solenoid
216 sensor
218 strut
220 pawl
222 pocket, or recess
224 pocket, or recess
226 spring
228 spring
230 teeth
232 actuator plate
234 notch
236 spring
242 first wall
244 body portion
246 first flange
248 second flange
250 second wall
252 flat region
254 pocket

What is claimed is:

1. A clutch assembly, comprising:
an actuator having an actuator plate;
an outer ring having a first pocket, a second pocket, and a third pocket defined in an inner surface thereof;
an inner ring disposed radially inward of the outer ring and rotatable about an axis in a first rotational direction and a second rotational direction opposite the first rotational direction;
a strut disposed within the first pocket and configured to be rotated within the first pocket by the actuator plate in the first rotational direction or the second rotational direction;
a pawl disposed within the second pocket and configured such that rotation of the strut pushes the pawl toward teeth disposed on an outer surface of the inner ring for engagement therewith to prevent rotation of the inner ring in the first rotational direction or the second rotational direction, wherein:
in a first mode of operation, the pawl does not contact the teeth, the inner ring is free to rotate in the first rotational direction and the second rotational direction, and the actuator is in a powered-off state;
in a second mode of operation, the pawl is in partial engagement with the teeth, the inner ring is free to rotate in the second rotational direction and prevented from rotation in the first rotational direction, and the actuator is in a powered-on state; and
in a third mode of operation, the pawl is in full engagement with the teeth and the inner ring is prevented from rotation in both the first and the second rotational directions; and a first spring disposed in the third pocket, the actuator plate being configured to axially displace into the third pocket to compress the spring and rotate the strut within the first pocket.

2. The clutch assembly of claim 1, wherein:
the actuator plate includes a notch;
the strut includes a body portion, a first flange extending radially outward from the body portion, and a second flange extending radially inward from the body portion;
the first flange is received within the notch of the actuator plate; and
the first flange is configured to rotate within the first pocket between a first wall and a second wall in response to axial displacement of the actuator plate in a first axial direction or a second axial direction.

3. The clutch assembly of claim 2, wherein:
the third pocket is adjacent the first pocket;
the first spring is radially aligned with the actuator plate; and
the spring biases the actuator plate toward the actuator in a first position where the first flange contacts the first wall.

4. The clutch assembly of claim 3, wherein, in the first mode of operation:
the actuator plate is in the first position;
the first flange of the strut contacts the first wall of the first pocket;
the second flange of the strut abuts an inner surface of the outer ring; and
the pawl is biased, by a second spring disposed within the second pocket, toward the outer ring in a retracted position such that a gap is formed between the pawl and the teeth of the inner ring.

5. The clutch assembly of claim 4, wherein, in the second mode of operation:
the actuator plate is moved, by the actuator, in a first axial direction to a second position partially compressing the first spring within the third pocket;
the first flange is rotated in the second rotational direction by the actuator plate to a position between the first wall and the second wall; and
the second flange of the strut pushes the pawl into partial engagement with the teeth of the inner ring to allow rotation of the inner ring in the second rotational direction and prevent rotation of the inner ring in the first rotational direction.

6. The clutch assembly of claim 5, wherein to transition from the second mode of operation to the first mode of operation:
the actuator is commanded to a powered-off state; and
the actuator plate is moved in a second axial direction by the first spring to the first position, thereby rotating the first flange in the first rotational direction to contact the first wall.

7. The clutch assembly of claim 5, wherein, in the third mode of operation:
the actuator plate is moved, by the actuator, further in the first axial direction to a third position fully compressing the first spring within the third pocket;
the first flange is rotated, by the actuator plate, further in the second rotational direction to contact the second wall of the first pocket; and
the second flange of the strut is rotated between the outer ring and the pawl to lock the pawl with the teeth of the inner ring to prevent rotation of the inner ring in the first and second rotational directions.

8. The clutch assembly of claim 7, wherein the second flange is arranged on a flat region of an outer surface of the pawl.

9. The clutch assembly of claim 7, wherein to transition from the second mode of operation to the third mode of operation, a reverse torque is applied to the inner ring.

10. The clutch assembly of claim 7, wherein to transition from the third mode of operation to the first mode of operation, the actuator is commanded to a powered-off state and a reverse torque is applied to the inner ring.

11. A clutch assembly, comprising:
an actuator having an actuator plate;
an outer ring having a first pocket, a second pocket, and a third pocket defined in an inner surface thereof;
an inner ring disposed radially inside of the outer ring and rotatable about an axis in a first rotational direction and a second, opposite, rotational direction;
a strut rotatably disposed within the first pocket;
a pawl rotatably disposed within the second pocket and configured to be rotated by the strut to selectively engage with teeth disposed on an outer surface of the inner ring to prevent rotation of the inner ring in the first rotational direction or the second rotational direction,
wherein, in an intermediate mode of operation, the actuator is in a powered-on state, the pawl is in partial engagement with the teeth of the inner ring, and the inner ring is free to rotate in the second rotational direction and is prevented from rotation in the first rotational direction;
wherein, in response to the actuator being commanded to a powered-off state during the intermediate mode of operation, the pawl rotates toward the outer ring and away from the teeth to a retracted position that allows rotation of the inner ring in both the first and second rotational directions; and
wherein, in response to application of a reverse torque to the inner ring during the intermediate mode of operation, the pawl is forced into full engagement with the teeth to prevent rotation of the inner ring in both the first and the second rotational directions; and
a spring disposed within the third pocket, the actuator plate being configured to axially displace into the third pocket to compress the spring and rotate the strut within the first pocket.

12. The clutch assembly of claim 11, wherein:
the actuator plate includes a notch;
the strut includes a body portion, a first flange extending radially outward from the body portion, and a second flange extending radially inward from the body portion; and
the first flange is received within the notch of the actuator plate and configured to be rotated within the first pocket by axial displacement of the actuator plate.

13. The clutch assembly of claim 12, wherein, in a freewheel mode, the pawl does not contact the teeth, the first flange of the strut contacts a first wall of the first pocket, the inner ring is rotatable in the first rotational direction and the second rotational direction, and the actuator is in the powered-off state.

14. The clutch assembly of claim 13, wherein, in a locked mode, the pawl is in full engagement with the teeth, the first flange of the strut contacts a second wall of the first pocket opposite the first wall, the second flange of the strut is disposed on a flat region of the pawl between the inner ring and the outer ring, and the inner ring is prevented from rotation in both the first and the second rotational directions.

15. The clutch assembly of claim 12, wherein the actuator is a solenoid configured to move the actuator plate in an axial direction to rotate the strut within the first pocket.

16. The clutch assembly of claim 11, wherein:
the third pocket is radially aligned with the first pocket; and
the spring is configured to bias the actuator plate toward the actuator.

17. The clutch assembly of claim 11, wherein the actuator plate is configured to axially displace into the third pocket to compress the spring and rotate the strut within the first pocket in response to the actuator being commanded to the powered-on state.

18. The clutch assembly of claim 12, wherein a further spring is disposed within the second pocket and is configured to bias the pawl toward the outer ring and away from the inner ring.

* * * * *